US009436779B2

(12) United States Patent
Liu et al.

(10) Patent No.: US 9,436,779 B2
(45) Date of Patent: Sep. 6, 2016

(54) TECHNIQUES OF EFFICIENT XML QUERY USING COMBINATION OF XML TABLE INDEX AND PATH/VALUE INDEX

(75) Inventors: Zhen Hua Liu, San Mateo, CA (US); Muralidhar Krishnaprasad, Fremont, CA (US); Hui Joe Chang, Fremont, CA (US); Vikas Arora, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 474 days.

(21) Appl. No.: 11/601,146

(22) Filed: Nov. 17, 2006

(65) Prior Publication Data

US 2008/0120321 A1    May 22, 2008

(51) Int. Cl.
G06F 17/30    (2006.01)

(52) U.S. Cl.
CPC ... *G06F 17/30917* (2013.01); *G06F 17/30463* (2013.01); *G06F 17/30911* (2013.01)

(58) Field of Classification Search
None
See application file for complete search history.

(56) References Cited

U.S. PATENT DOCUMENTS

| | | | |
|---|---|---|---|
| 5,546,576 A * | 8/1996 | Cochrane et al. | 707/2 |
| 6,366,934 B1 | 4/2002 | Cheng et al. | |
| 6,519,597 B1 | 2/2003 | Cheng et al. | |
| 6,643,633 B2 * | 11/2003 | Chau | G06F 17/30917 |
| 6,654,734 B1 | 11/2003 | Mani et al. | |
| 6,694,306 B1 | 2/2004 | Nishizawa et al. | |
| 6,708,186 B1 | 3/2004 | Claborn et al. | |
| 6,799,184 B2 | 9/2004 | Bhatt et al. | |
| 6,832,219 B2 | 12/2004 | Lal | |
| 6,915,304 B2 * | 7/2005 | Krupa | 707/756 |
| 6,925,470 B1 | 8/2005 | Sangudi et al. | |
| 7,024,425 B2 | 4/2006 | Krishnaprasad et al. | |
| 7,031,956 B1 | 4/2006 | Lee et al. | |
| 7,124,144 B2 * | 10/2006 | Christianson et al. | |
| 7,146,365 B2 | 12/2006 | Allen et al. | |
| 7,315,852 B2 | 1/2008 | Balmin et al. | |
| 7,398,265 B2 | 7/2008 | Thusoo et al. | |
| 7,657,549 B2 * | 2/2010 | Morris et al. | 707/999.101 |
| 2001/0037345 A1 | 11/2001 | Kiernan et al. | |

(Continued)

OTHER PUBLICATIONS

Priti, Patil et al., "Holistic Schema Mappings for XML-on-RDBMS", Database systems for advanced applications, vol. 3882, Lecture notes in Computer Science, Springer-Verlag, Jan. 1, 2006, 16 pages.

(Continued)

*Primary Examiner* — Charles Adams
(74) *Attorney, Agent, or Firm* — Hickman Palermo Becker Bingham LLP

(57) ABSTRACT

A mechanism is provided for accessing XML data in a database system using a combination of a XML Table Index table and a XML Path Index table. By using a combination of a XML Table Index and a XML Path Index, both selection access and navigational access involved in a query can be optimized. For example, the XML Table Index gives the database system an ability to readily evaluate the predicate expression, thereby improving the selection access. Moreover, in some embodiments, the selection access can be further improved by using secondary indexes on columns contained in the XML Table Index table. In a complementary manner, the XML Path Index table gives the database system an ability to navigate to a specific location given a path expression, thereby improving the navigational access. Thus, by combining both tables, both selection and navigational accesses are improved.

28 Claims, 2 Drawing Sheets

(56) References Cited

U.S. PATENT DOCUMENTS

| | | | |
|---|---|---|---|
| 2002/0078068 A1* | 6/2002 | Krishnaprasad et al. | 707/104.1 |
| 2003/0101169 A1* | 5/2003 | Bhatt | G06F 17/30569 |
| 2003/0140308 A1 | 7/2003 | Murthy et al. | |
| 2003/0172059 A1* | 9/2003 | Andrei | G06F 17/30454 |
| 2003/0177443 A1* | 9/2003 | Schnelle et al. | 715/513 |
| 2003/0212662 A1 | 11/2003 | Shin et al. | |
| 2003/0212664 A1* | 11/2003 | Breining et al. | 707/3 |
| 2004/0034615 A1* | 2/2004 | Thomson et al. | 707/1 |
| 2004/0148278 A1 | 7/2004 | Milo et al. | |
| 2004/0163041 A1* | 8/2004 | Engel | 715/509 |
| 2004/0167904 A1 | 8/2004 | Wen et al. | |
| 2004/0225724 A1 | 11/2004 | Pavlik et al. | |
| 2004/0267760 A1 | 12/2004 | Brundage et al. | |
| 2005/0010896 A1 | 1/2005 | Meliksetian et al. | |
| 2005/0055336 A1* | 3/2005 | Hui | G06F 17/30923 |
| 2005/0055355 A1 | 3/2005 | Murthy et al. | |
| 2005/0091188 A1* | 4/2005 | Pal et al. | 707/1 |
| 2005/0120029 A1 | 6/2005 | Tomic et al. | |
| 2005/0228792 A1* | 10/2005 | Chandrasekaran et al. | 707/9 |
| 2005/0228828 A1* | 10/2005 | Chandrasekar et al. | 707/104.1 |
| 2005/0229158 A1* | 10/2005 | Thusoo et al. | 717/115 |
| 2005/0240624 A1 | 10/2005 | Ge et al. | |
| 2005/0289125 A1 | 12/2005 | Liu et al. | |
| 2006/0004725 A1* | 1/2006 | Abraido-Fandino | 707/3 |
| 2006/0101320 A1* | 5/2006 | Dodds | G06F 17/30569 715/239 |
| 2006/0173865 A1* | 8/2006 | Fong | 707/100 |
| 2006/0212420 A1 | 9/2006 | Murthy | |
| 2007/0011184 A1* | 1/2007 | Morris | G06F 17/2247 |
| 2007/0038649 A1 | 2/2007 | Agrawal et al. | |
| 2007/0239681 A1 | 10/2007 | Krishnaprasad et al. | |
| 2008/0189302 A1 | 8/2008 | Evani | |

OTHER PUBLICATIONS

Hammerschmidt, B C et al., "Autonomous Index Optimization in XML Databases", 21$^{st}$ International Conference on Data Engineering, XP010924124, IEEE, Apr. 5, 2005, 10 pages.

European Patent Office, "International Search Report", PCT/US2008/052932, dated Jun. 13, 2008, 13 pages.

Claims, PCT/US2008/052932, 4 pages, 2008.

Salminen, Ari et al., "Requirements for XML Document Database Systems" Dept. of Computer Science and Information Systems, University of Jwaskya, 2001, pp. 85-94.

Bohannon, Philip et al., From XML Schema to Relations: A Cost-Based Approach to XML Storage, Bell Laboratories, Proc of the 18$^{th}$ International Conference on Data Engineering, IEEE, 2002, pp. 1-28.

U.S. Appl. No. 11/641,419, filed Dec. 18, 2006, Office Action, May 10, 2010.

U.S. Appl. No. 11/641,379, filed Dec. 18, 2006, Notice of Allowance, Jun. 22, 2010.

U.S. Appl. No. 11/728,650, filed Mar. 26, 2007, Final Office Action, Jan. 28, 2010.

Crestana et al., "Consistent Schema Version Removal: An Optimization Technique for Object-Oriented View", 2000.

R. Bourret et al., "A Generic Load/Extract Utility for Data Transfer Between XML Documents and Relational Databases", Department of Computer Science, Darmstadt, Germany, 2000.

Kanne et al., "Efficient stoage of XML data", In Proceedings of the 16$^{th}$ International Conference on Data Engineering, 2000.

U.S. Appl. No. 11/728,650, filed Mar. 26, 2007, Notice of Allowance, Jul. 9, 2010.

U.S. Appl. No. 11/601,147, filed Nov. 17, 2006, Decision on Appeal, Feb. 13, 2013.

U.S. Appl. No. 11/601,147, filed Nov. 17, 2006, Notice of Allowance, Feb. 26, 2013.

U.S. Appl. No. 10/944,171, filed Sep. 16, 2004, Apr. 19, 2007.

U.S. Appl. No. 11/100,083, filed Apr. 5, 2005, Office Action, May 23, 2008.

* cited by examiner

TECHNIQUES OF EFFICIENT XML QUERY USING COMBINATION OF XML TABLE INDEX AND PATH/VALUE INDEX

This application is related to U.S. patent application Ser. No. 11/394,878, entitled "TECHNIQUES OF EFFICIENT XML META-DATA QUERY USING XML TABLE INDEX", filed by MURALIDHAR KRISHNAPRASAD et al. on Mar. 31, 2006, the entire contents of which is hereby incorporated by reference for all purposes as if fully set forth herein.

This application is related to U.S. patent application Ser. No. 10/884,311, entitled "INDEX FOR ACCESSING XML DATA", filed by SIVASANKARAN CHANDRASEKARAN et al. on Jul. 2, 2004, the entire contents of which is hereby incorporated by reference for all purposes as if fully set forth herein.

This application is related to U.S. patent application Ser. No. 11/601,147, entitled "TECHNIQUES OF EFFICIENT QUERY OVER TEXT, IMAGE, AUDIO, VIDEO AND OTHER DOMAIN SPECIFIC DATA IN XML USING XML TABLE INDEX WITH INTEGRATION OF TEXT INDEX AND OTHER DOMAIN SPECIFIC INDEXES", filed by ZHEN HUA LIU et al. on Nov. 17, 2006, the entire contents of which is hereby incorporated by reference for all purposes as if fully set forth herein.

FIELD OF THE INVENTION

The present invention relates to managing information and, more specifically, accessing information contained in XML documents that are stored in a database system.

BACKGROUND

Many database systems now support storage and querying of eXtensible Markup Language data ("XML data"). XML data can take the form of a collection of XML documents. The collection of XML documents may be stored in an aggregate form in a database system. In the aggregate form, the XML documents can be stored as LOBs ("Large Binary Objects") in such a base structure as a LOB table. An example of one such XML document may be as follows:

```
po.xml

<purchaseOrder>
    <reference>GHB3567</reference>
    <shipAddrCity>Oakland</shipAddrCity>
    <billAddrCity>Berkeley</billAddrCity>
    <lineItem itemNo = 34>
        <itemName>CPU</itemName>
        <itemQuantity>3</itemQuantity>
        <itemUnitPrice>123.45</itemUnitPrice>
    </lineItem>
    <lineItem itemNo = 68>
        <itemName>Memory</itemName>
        <itemQuantity>3</itemQuantity>
        <itemUnitPrice>23.45</itemUnitPrice>
    </lineItem>
</purchaseOrder>
```

Once the collection of the XML documents is stored in the database system, queries can be run against the database to retrieve XML documents or fragments thereof. SQL language has been expanded to support XQuery type of queries against XML data in a database system. For example, given a database system that stores the collection of XML documents including po.xml., a query such as Q1 below can be submitted to the database system:

```
Q1

Select extract(value(v), "/purchaseOrder/lineItem")
from PurchaseOrder v
where existsnode(value(v), "//lineItem[ItemQuantity > 40
    and ItemUnitPrice > 39.95]") =1
```

Assming a LOB table that stores the collection of XML documents is named PurchaseOrder, this query Q1 finds XML documents (a subset of the collection of XML documents) stored in the PurchaseOrder table each of which has at least one lineItem with unit price more than 39.95 and quantity more than 40. This query returns all lineItem fragments (even though only one satisfies the predicate expressions in the "WHERE" clause) out of each of the XML documents found.

Given Q1, the database system can prepare a first query plan in which each record (that either contains or maps to a XML document) of the PurchaseOrder is retrieved and subsequently searched based on XQuery expressions associated with the query Q1. Since the XQuery related search is directly performed on the XML documents retrieved from the database system, the database system provides little value-added services other than storage and document retrievals. Furthermore, since every XML document must be retrieved from the database system, committed to memory and processed to evaluate XQuery expressions, this first query plan of Q1 would be quite slow.

As an alternative, the collection of XML documents can be stored in a shredded form in the database system. In this form, base structures in the database system can be defined in such a way as to capture hierarchical relationships among nodes in a XML document. Accordingly, when an XML document is submitted to the database system for storage, it is shredded into node values. The node values shredded are then stored in their respective base structures (e.g., a column in a base table).

When the collection of XML documents is stored in the shredded form, or object relationally, Q1 can be efficiently executed to find out all the qualified XML documents. For example, a (nested) table lineItem may be setup to capture all the sub-nodes under the node "lineItem" contained in the XML documents. Furthermore, the PurchaseOrder table in the shredded form may store a foreign key column "setid", which corresponds to a primary key column "nested_table_id" in the (nested) lineItem table. The "nested_table_id" column contains a unique identifier associated with each set of lineItem sub-nodes contained in the collection of XML documents.

One can create B-tree numeric index(es) on ItemQuantity and ItemUnitPrice columns of the lineItem table. The database system can prepare a second query plan that take advantage of the index created, as represented by a rewritten query Q2 as follows:

```
Q2

Select (select xmlagg(xmlelement("lineItem",
    xmlattributes(itemno as "itemNo"), xmlforest(itemName,
    itemQuantity, itemUnitPrice)))
    From lineItem li2
    Where li2.nested_table_id = v.setid)
from PurchaseOrder v, lineItem li
```

-continued

```
                    Q2 where exists(
            select 1
            from li
``` of accessing the collection directly, a query accesses an XML Path Index that is associated with a collection of XML documents. An XML Path Index is a table, separate from the base structures storing the collection of XML documents. The XML Path Index logically indexes the collection of XML documents. In the present example, where the collection of XML documents includes po.xml, such a table may comprise a plurality of columns as indicated in Table 1.

TABLE 1

XML Path Index Table (PO_PATH_IDX_TAB) for PurchaseOrder

| DocId | Path | Value | OrderedKey | XmlLocator |
|---|---|---|---|---|
| Did1 | /PurchaseOrder | | 1 | Ptr1 |
| Did1 | /PurchaseOrder/reference | GHB3567 | 1.1 | Ptr2 |
| Did1 | /PurchaseOrder/ShipAddrCity | Oakland | 1.2 | Ptr3 |
| Did1 | /PurchaseOrder/BillAddrCity | Berkeley | 1.3 | Ptr4 |
| Did1 | /PurchaseOrder/lineItem | | 1.4 | Ptr5 |
| Did1 | /PurchaseOrder/lineItem/@itemNo | 34 | 1.4.1 | Ptr6 |
| Did1 | /PurchaseOrder/lineItem/itemName | CPU | 1.4.2 | Ptr7 |
| Did1 | /PurchaseOrder/lineItem/itemQuantity | 3 | 1.4.3 | Ptr8 |
| Did1 | /PurchaseOrder/lineItem/itemUnitPrice | 123.45 | 1.4.4 | Ptr9 |
| Did1 | /PurchaseOrder/lineItem | | 1.5 | Ptr10 |
| Did1 | /PurchaseOrder/lineItem/@itemNo | 68 | 1.5.1 | Ptr11 |
| Did1 | /PurchaseOrder/lineItem/itemName | Memory | 1.5.2 | Ptr12 |
| Did1 | /PurchaseOrder/lineItem/itemQuantity | 3 | 1.5.3 | Ptr13 |
| Did1 | /PurchaseOrder/lineItem/itemUnitPrice | 23.45 | 1.5.4 | Ptr14 |
| Did2 | ... | | ... | ... |

-continued

```
                    Q2 where li.nested_table_id = v.setid and
       li.ItemQuantity > 40 and li.ItemUnitPrice >
       39.95);
```

This query accesses the lineItem table to find all lineItem sets stored that match the value predicate expressions with respect to ItemQuantity and ItemUnitPrice. Thus, selection of the XML documents that match the predicate expressions does not have to be performed directly on the XML documents, but rather performed on a much smaller set of data that stores in the lineItem table. Furthermore, because there is a value index on ItemQuantity and ItemUnitPrice columns of the lineItemTable, the table access on the lineItemTable does not require a full table scan. Compared with the first query plan, this second query plan would be much faster.

A disadvantage of this shredded storage approach is that it requires a priori (e.g., prior to compilation of a query) knowledge about a XML schema that describes the collection of XML documents. If, however, the XML schema did not exist or were unknown, the database system would not be able to define properly a set of base structures that would reflect all data types and structural relationships the collection of XML documents could embody.

Even if the schema did exist and were known, still not all the data types or structural relationships in the collection of XML documents would be useful in many queries. For example, in cases where a user is only interested in a limited number of nodes in a collection of XML documents, a corresponding XML schema probably defines too many extraneous data types and too many complex, extraneous structural relationships about which very few queries care. Shredding a collection of XML documents and storing resultant node values entails wasted efforts with little advantage in return.

XML Path Indexes can speed up XQuery types of queries that contain XPath expressions. Under this approach, instead Each row of the XML Path Index table represents a node contained in a XML document that is associated with a document identifier (DocId), e.g., "Did1". A complete set of rows in the XML Path Index table having a particular value of the Doc ID represents a logical hierarchical representation of nodes contained in a XML document that is associated with the particular value of the Doc ID. Specifically, the DocId column as shown stores a unique identifier for each of the XML documents in the collection. The Path column stores a path identifier for a node in a XML document. The Value column stores a value for the node if any. This column may contain a null value if the node does not have a value. The OrderedKey column stores hierarchical order information as represented using a Dewey-type value. Specifically, the OrderedKey of a node can be created by appending a value to the OrderedKey of the node's immediate parent, where the appended value indicates the position, among the children of the parent node, of that particular child node. The XmlLocator column stores logical pointers each of which points to fragments in the associated XML document which fragments correspond to the node.

Given the XML Path Index table, the database system can prepare a third query plan that takes advantage of the XML Path Index table created, as represented by a rewritten query Q3 as follows:

```
                    Q3 select (select XMLAgg(MKINI(P3.XmlLocator))
       from PO_PATH_INDX_TAB p3
       where p3.DocId = v.DocId
          and p3.path = "/PurchaserOrder/lineItem"
       order by p3.orderedkey)
    from purchaseOrder v
    where
    exists(
       select 1
       from PO_PATH_INDX_TAB p1, PO_PATH_INDX_TAB p2
       where p1.path ="/PurchaseOrder/lineItem/itemQuantity"
          and to_number(p1.value) > 40 and p2.path =
```

-continued

| Q3 |
|---|
| "'/PurchaseOrder/lineItem/itemUnitPrice" and<br>to_number(p2.value) > 23.45 and<br>parent_key(p1.OrderedKey)=<br>parent_key(p2.OrderedKey) and p1.DocId =<br>p2.DocId and v.DocId = p1.DocId); |

Here MKINI( ) in the query Q3 is a function or macro that maps a logical pointer of a row stored in the XmlLocator column to a location in a XML document that contains a node associated with the row.

Using the XML Path Index table to query the desired XML data, the database system avoids a need to retrieve every XML document in the collection of XML documents, or perform ad-hoc XPath-based queries directly on contents of the retrieved XML documents. Thus, many if not all XPath-based queries associated with the original query Q1 can be answered by looking at values contained in the XML Path Index table, instead of directly accessing the base structures that stores XML documents.

However, this approach (using XML Path Index) has its own disadvantages. As shown in the XML Path Index table (Table 1), since each node value (such as @itemNo, item-Name, itemQuantity, itemUnitPrice, etc.) is stored as a row in the XML Path Index table PO_PATH_INDX_TAB, Q3 has to do a self-join. In fact, the number of self-joins is proportional to the number of properties under lineItem that are specified in the predicate expressions. Furthermore, even if there is a B-tree numeric value index on the value column of PO_PATH_INDX_TAB, irrelevant data in the XML Path Index table has to be read to determine whether a particular row is of a node of a right type (such as itemQuantity and itemPrice in this example) specified in the predicate expressions before actually evaluating the predicate expressions.

Because of these limitations, the existing techniques are not as efficient in accessing XML documents in a database system as would be desired. As a result, a better mechanism that would improve accessing XML documents in a database system is needed.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
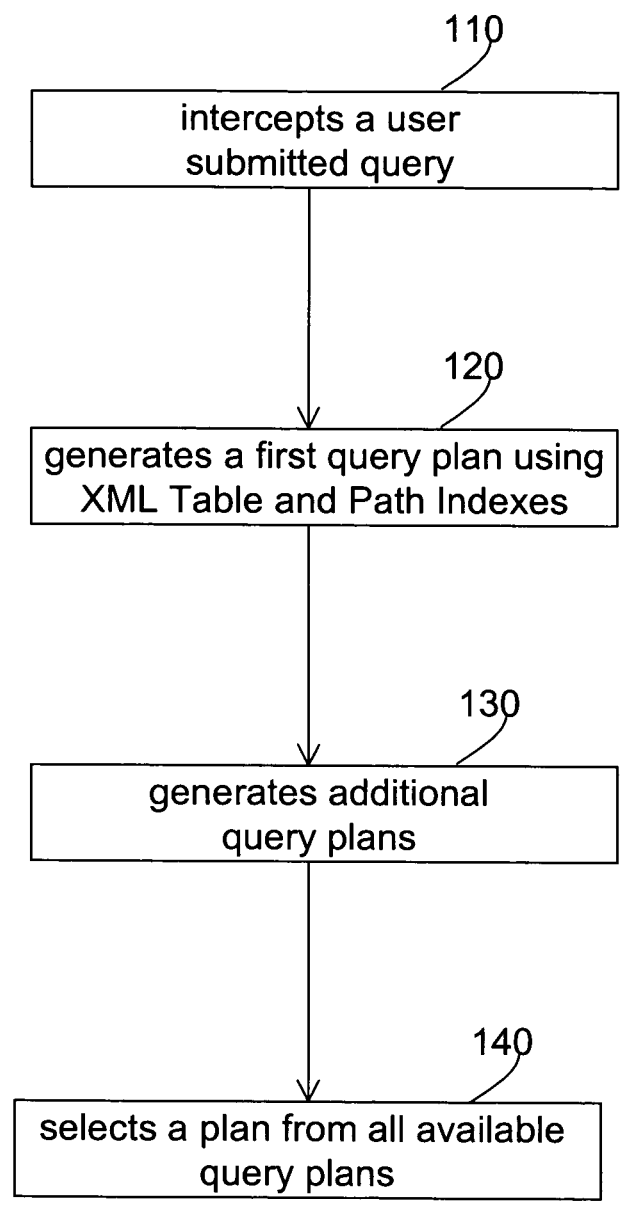
FIG. 1 is a flowchart illustrating how queries on the collection of XML documents can leverage both XML Table Index and XML Path Index in an embodiment.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Functional Overview

A mechanism is provided for accessing XML data (a collection of XML documents) in a database system using a combination of a XML Table Index table and a XML Path Index table. An XML Table Index is a table, separate from both the base structures storing the collection of XML documents and the XML Path Index table. Like the XML Path Index table, the XML Table Index also logically indexes the collection of XML documents, albeit in a different way. The XML Table Index table includes a plurality of columns that corresponds to a plurality of nodes in the XML documents. Node values associated with the plurality of nodes for a given documents are stored in the plurality of columns in each row of the XML Table Index that is associated with the given document (note that one or more rows may be associated with the given document). Preferably, columns in the table of XML Table Index are ones commonly associated with XPath-based expressions (e.g., a predicate) specified in queries.

An XML document contains an information hierarchy of data items comprising elements and element attributes. For convenience of expression, as used herein, the term "node" refers to a data item (e.g., element or element attribute) of any particular type in the information hierarchy contained in the XML document.

Generally speaking, a query on the collection of XML documents comprises two types of accesses. One is a selection access, specified by predicate expressions and used to select some XML documents or fragments thereof that satisfy the predicate expressions. The other is a navigational access, specified by a path expression (e.g., an XPath expression) and used to navigate to the specific location where the desired information is located.

By using a combination of a XML Table Index and a XML Path Index, both accesses can be optimized. For example, the XML Table Index gives the database system an ability to readily evaluate the predicate expression, thereby improving the selection access. Moreover, in some embodiments, the selection access can be further improved by using secondary indexes on columns contained in the XML Table Index table. In a complementary manner, the XML Path Index table gives the database system an ability to navigate to a specific location given a path expression, thereby improving the navigational access. Thus, by combining both tables, both selection and navigational accesses are improved.

Besides the benefits discussed above, the combined use of both XML Table Index and XML Path Index in executing XML queries may result in, but is not limited to, one or more of the following additional benefits: (1) Selection of relevant XML documents that match relevant properties can be efficiently made with a secondary index on these two tables if the relevant properties are captured in the secondary index. For example, a secondary index can narrow the selection to a small portion of the collection of XML documents, thereby obviating a need to perform a full scan against the entire collection of XML documents. (2) Prior knowledge of XML schema is not required, as long as relevant properties of nodes to be included in the XML Table Index table are known. (3) XML documents can be flexibly stored in any desirable form. For example, XML documents can be stored in either aggregate form (e.g., an entire XML document stored in a LOB or in a tree form) or a fully shredded form (all nodes in an XML document are represented by their respective columns in object-relational tables), or a form in between (some but not all nodes in an XML document are represented by columns in object-relational table).

The mechanism in the present invention in various embodiments may be used regardless of the format and data structures used to store the actual XML data (the "base structures"). For example, the actual XML data can reside in structures within or outside of a database, in any form, such as CLOB (character LOB storing the actual XML text), O-R (object relational structured form in the presence of an XML schema), or BLOB (binary LOB storing some binary form of the XML), or tree form, or as a file on a server.

The mechanism may also be used regardless of the types of XML data stored in the columns in the XML Table Index such as text data, image data, sound data or other opaque data, or a combination thereof.

Example XML Document

For the purpose of explanation, examples shall be given hereafter with reference to the XML document, po.xml, shown before. However, as indicated before, po.xml is merely an example of XML documents. The techniques described herein are not limited to XML documents having any particular types, structure or content. Examples shall be given hereafter of how such documents would be indexed and accessed according to various embodiments of the invention.

XML Table Index

In one embodiment, a collection of XML documents including po.xml is stored in an aggregate storage. An XML Table Index is a table that is created to index the collection of XML documents. The XML Table Index projects out nodes from a collection of XML documents into columns. The collection of XML documents remains in aggregate form, but with the creation of the XML Table Index, queries for frequently requested nodes can be run against the XML Table Index. The queries which access the XML Table Index can be more efficient than the queries which directly access the collection of XML documents.

To further illustrate, consider a collection of XML documents that comprises po.xml as shown before. In one embodiment, the collection of XML documents is stored in an aggregate form in a column "object_value" of a base database structure "PurchaseOrder". To generate the XML Table Index for the collection of XML documents, a "CREATE INDEX" DDL statement is executed. An example of such a statement is shown as follows:

---
CREATE INDEX Statement 1
---
CREATE INDEX POIndex ON PurchaseOrder(object_value)
IndexType is XDB.XMLTableIndex
PARAMETERS( 'XMLTABLE PO_INDEX_TAB "//lineItem"
    Columns ItemNo number path '@itemNo',
        ItemName varchar2(40) path 'itemName',
        ItemQuantity number path 'itemQuantity',
        ItemUnitPrice number path 'itemUnitPrice');
---

A row pattern is specified in a CREATE INDEX 1 statement. For example, in the above statement, "//lineItem" is specified as the row pattern. Various column patterns called "itemName", "itemQuantity", "itemUnitPrice" follow the row pattern in the statement. The row pattern directs the database system to a location of a node in the collection of XML documents, where a plurality of nodes (descendants or sub-nodes of the node) can be located and projected out into the XML Table Index table by the database system. In one embodiment, it has been determined that ItemNo, ItemName, ItemQuantity, and ItemUnitPrice are nodes common to most PurchaseOrder queries. Accordingly, the XML Table Index is created with columns for each of those nodes. In alternative embodiments, a different set of nodes may be used to define the columns in the XML Table Index.

As this discussion shows, an XML Table Index type index can be created by executing a "CREATE INDEX" statement. In one embodiment, this index internally comprises a table named in the statement. For example, the "CREATE INDEX" statement above creates an XML Table Index type index named "POIndex", which is internally a table named "PO_INDEX_TAB". In one embodiment, PO_INDEX_TAB is an object-relational table, which may be queried using object-relational techniques.

The columns in the XML Table Index can be populated with node values extracted from po.xml as shown in Table 2.

TABLE 2

| PO_INDEX_TAB | | | | |
|---|---|---|---|---|
| DocId | ItemNo | ItemName | ItemQuantity | ItemUnitPrice |
| Rid1 | 34 | CPU | 3 | 123.45 |
| Rid1 | 68 | Memory | 3 | 23.45 |
| Rid2 | . . . | . . . | . . . | . . . |

In some embodiments, among the nodes captured in PO_INDEX_TAB, there may be columns that store values of complex data types such as text data, image data, audio data, video data and other types of opaque data. In one embodiment, values of complex data types may be stored in virtual columns in a XML Table Index. The term "virtual column" refers to a column that does not store raw values of a XML node, but rather stores location information that the database system can use to map to the raw values of the XML node.

The use of a virtual column is optional. In one embodiment, raw values of an XML node of a complex data type may still be stored in the XML Table Index. However, by using virtual columns in place of raw values, the database system can avoid storing large amount of data redundantly in an index table like an XML Table Index table, thereby saving resources and efforts associated with storing, modifying and deleting raw values for complex data types. This does not create any disadvantage, because, as noted before, queries about complex data types are unlikely to be formulated in terms of raw values. Thus, this virtual column approach loses little practical advantage, if at all.

Since the XML Table Index table is used to store rows extracted from a collection of XML documents, a DocId column can be added to the table to keep track of which XML document a particular row pertains to. Since each XML document in the collection is assigned a unique value of DocId to distinguish it from the rest of the collection, for a given XML document, the DocId column in the XML Table Index table stores the same values as those in the DocId column of the XML Path Index table.

Secondary Indexes

The XML Table Index table includes information of a number of nodes contained in the collection of XML documents that satisfy a wide range of queries. However, without secondary access structures, using the XML Table Index table to satisfy such queries will often require full scans of the XML Table Index table. Therefore, according to one embodiment, a variety of secondary indexes are created and maintained by the database system to accelerate the queries that perform selection of rows from the XML Table Index table. For example, ordinary B-tree indexes can be created and maintained for the ItemQuantity and ItemUnitPrice columns.

For the purpose of illustration, a regular B-tree index, i.e., PO_INDEX_BTREE, is built on two columns, namely, ItemQuantity and ItemUnitPrice, of the XML Table Index (PO_INDEX_TAB). Thus, entries in the PO_INDEX_BTREE are in the form (keyvalue, entryvalue), where keyvalue is a composite value representing a particular ItemQuantity/ItemUnitPrice combination, and entryvalue identifies a row (or entry) of the XML Table Index table.

When ItemQuantity and ItemUnitPrice are known, the PO_INDEX_BTREE may be used to quickly locate the corresponding rows within the XML Table Index table. For example, based on a key value "3/123.45", the PO_INDEX_BTREE may be traversed to find the entry that is associated with the key value. Assuming that the XML Table Index table is populated as illustrated above, the index entry would have an entryvalue of Did1/34, which points to a row in the XML Table Index table with a DocId "Did1" and a ItemNo 34.

As this discussion demonstrates, this secondary index PO_INDEX_BTREE can be used by the database system to filter rows from the XML Table Index that matches specified predicates involving ItemQuantity and ItemUnitPrice columns, thereby avoiding a full scan on the XML Table Index.

Query Rewrite Leveraging Non-Scalar Index

After XML Table Index and Path Index tables have been created and populated, they can be used to speed up queries involving selection access and navigational access of the collection of XML documents. When a query is submitted on the collection of XML documents, the database system can leverage both XML index tables (i.e., the XML Table Index and the XML Path Index) to find results more quickly.

For example, according to one embodiment, when a query, which involves both selection access and navigational access of XML documents, is submitted on a collection of XML documents, the database system first checks to see whether there exists a XML Table Index and a XML Path Index for the collection of XML documents; if so, then the database system checks to see whether a plurality of columns in the XML Table Index include one or more columns corresponding to nodes in the XML documents that are specified in predicate expressions of the query; and if so, the database system further checks to see whether the one or more columns are included in a secondary index of the XML Table Index table. If the one or more columns (e.g., the DocId column) are included in a secondary index, then the original query is internally rewritten to take advantage of the secondary index.

Whether there is a usable secondary index on the columns of the XML Table Index table or not, the DocId column of the XML Table Index table is used to join with the DocId column of the XML Path Index table. This joining operation correlates selected rows in the XML Table Index table with a set of row of the XML Path Index table. The set of rows correlated in the XML Path Index table can be used to filter out one or more path expressions in the Path column of the same table that match what has been specified in the query statement. In the present example, the DocId column of the PO_INDEX_TAB (XML Table Index) table is used to join with the DocId column of the PO_PATH_INDEX_TAB. This joining operation correlates all lineItem rows in PO_INDEX_TAB with a set of rows in PO_PATH_INDEX_TAB.

Accordingly, we can rewrite Q1 into Q4 as follows:

---
Q4
---
select (select XMLAgg(MKINI(P3.LOBPtr))
   from PO_PATH_INDX_TAB p3
   where p3.DocId = v.DocId and p3.path =
    "/PurchaserOrder/lintItem"
   order by p3.orderedkey)
from purchaseOrder v
where
exists(
  select 1
  from PO_XMLTAB_IDX_TAB t
  where t.ItemPrice >23.45 and t.ItemQuantity > 40 and
    v.DocId = t.DocId);

---

A major difference between Q3 and Q4 is that Q4 avoids self-joining of the XML Path Index table. Since the XML Table Index table captures the columns that are relevant in the predicate expressions of the original query Q1, the predicate expressions can be efficiently evaluated against rows in the XML Table Index without self-joining or any other joining. As the number of nodes under lineLitem needs to be searched for increases, Q4 scales better than Q3 because Q3 has to add additional self-join on the PO_PATH_INDX_TAB whereas Q4 only needs add an additional column in the XML Table Index table to be searched for.

Another difference between Q3 and Q4 is that Q4 can use a B-tree numeric index on ItemPrice and ItemQuanity to efficiently find qualified PurchaseOrder documents as identified by the DocId column of the selected rows in the XML Table Index table. Using the B-tree numeric index, even as the number of XML documents significantly increases, the number of search operations involved in selecting the rows from the XML Table Index table increases slowly (logarithmically).

Storing Ordered Key in XML Table Index

Consider another query Q5 as follows:

---
Q5
---
Select extract(value(v),
  "/PurchaseOrder/LineItems[itemQuantity > 40 and
  itemPrice > 23.45]")
from purchaseOrder v

---

This query Q5 differs from Q1 in that Q5 returns only lineItem fragments from a XML document in the collection of documents if the lineItem fragments individually satisfy XQuery type of expressions (itemQuantity>40 and itemPrice>23.45) specified. Just as in the case of Q1, this query Q5 involves two types of accesses, namely, selection access and navigational access. Specifically, the XQuery type of expressions selects some XML documents out of the collection of XML documents stored in the base database structure "PurchaseOrder", while a XPath type of expression (extract( . . . "/PurchaseOrder/lineitem")) provides a direction for navigational access to the selected XML documents. Thus, in some embodiments, both XML Path Index table and XML Table Index table can be used together to yield an efficient query plan.

In one embodiment, an ordered key for the row pattern (i.e., lineItem) can be stored in the XML Table Index in a corresponding column "OrderedKey". As described before, in one embodiment, the OrderKey of a node is created by appending a value to the OrderKey of the node's immediate parent, where the appended value indicates the position, among the children of the parent node, of that particular child node. In this example, an OrderedKey for a lineItem row pattern comprises two parts: (i) an OrderedKey for a parent node containing the lineItem row pattern and (ii) a value indicating the position of the lineItem row pattern among the children of the parent node. The XML Table Index table with the added column "OrderedKey" with populated values is shown in a new PO_INDEX_Table (Table 3).

TABLE 3

New PO_INDEX_TAB with OrderedKey

| DocId | OrderedKey | ItemNo | ItemName | ItemQuantity | ItemUnitPrice |
|-------|------------|--------|----------|--------------|---------------|
| Rid1  | 1.4        | 34     | CPU      | 3            | 123.45        |
| Rid1  | 1.5        | 68     | Memory   | 3            | 23.45         |
| Rid2  | . . .      | . . .  | . . .    | . . .        | . . .         |

To take advantage of both XML Table Index and XML Path Index, Q5 can be rewritten into a Q6 as follows:

Q6

```
Select (select XMLAgg(MKINI(P3.LOBPtr))
   from PO_PATH_INDX_TAB p3
   where p3.path = "/PurchaserOrder/lineItem" and
      exists(select 1
         from PO_XMLTAB_IDX_TAB t
         where t.DocId = p3.DocId and t.ItemPrice
            >23.45 and t.ItemQuantity > 40 and
            t.orderedkey = p3.orderedke)
      order by p3.orderedkey)
   from purchaseOrder v;
```

Just as in Q4, the query plan Q6 also uses predicate expressions to select rows from the XML Table Index table. Furthermore, information obtained from the selected rows of the XML Table Index table is used to access the XML Path Index table. That way, only a narrow set of rows in the XML Path Index table that matches the information from the selected rows of the XML Table Index table needs to be looked at.

However, unlike Q4, in Q6, the joining of the XML Table Index table and the XML Path Index table is not through DocId/DocId, but rather via the two OrderedKey columns in their respective tables (i.e., the XML Table Index table and the XML Path Index table). In the present example, the OrderedKey column of the PO_INDEX_TAB (XML Table Index) table is used to join with the OrderedKey column of the PO_PATH_INDEX_TAB. This joining operation extracts those nodes corresponding to lineItems, each of which lineItems satisfies the predicate expressions specified.

Chained XML Table Index

In some situations, nodes under a particular row pattern are composed of several nested levels. To further illustrate, suppose that there are multiple parts under a lineItem and that a user issues a new query Q7 as follows:

Q7

```
Select extract(value(v),
   "/Purchaseorder/lineItem[Part/partNo > 45 and
   Part/partPrice > 34.45]")
From PurchaseOrder v;
```

In this example, each row pattern (parent node) "lineItem" contains a group of nodes such as ItemQuantity and ItemUnitPrice directly descending from lineItem, but also a group of nodes such as partNo and partPrice under a child node "Part" (of the node "lineItem"). In other words, a PurchaseOrder XML document can have a list of lineItems, each of which has a list of Part's.

Similar to what has been noted before, under conventional query techniques, a query such as Q7 would perform an exhaustive search on the XML documents and eventually return requested fragments from all PurchaseOrder documents that satisfy the listed predicate conditions.

In accordance with one embodiment of the present invention, XML Table Index and XML Path Index table can be used to together to yield a more efficient query execution plan. In one embodiment, XML Table Index tables are created in a chained fashion to enhance hierarchical navigation of XML data. For example, a collection of XML documents stored in a database system may be indexed by a chain of XML Table Index tables each of which covers a separate group of nodes of the XML documents. In one embodiment, a single query plan may search multiple XML Table Index tables in the chain and return a single result set extracted from these XML Table Index tables.

For example, to speed up Q7, in one embodiment, an XML Table Index index internally chains a plurality of XML Table Index tables together. As before, the PO_INDEX_TAB maintains a list of lineItems. Each lineItem in turn references a list of Part's. The list within a list creates a chain of data that helps overcome storage and access issues. In one embodiment, when values are extracted from the collection of XML documents, chained tables for an XML Table Index index are created so that there is a primary and foreign key join between the chained tables.

To generate chained XML Table Index tables for the collection of XML documents, a "CREATE INDEX" DDL statement as follows can be executed:

CREATE INDEX Statement 2

```
CREAT INDEX POIndex ON PurchaseOrder(object_value)
IndexType is XDB.XMLTableIndex
PARAMETERS(XMLTABLE PO_INDEX_TAB "//lineItem"
Columns ItemNo number path '@itemNo',
   ItemName varchar2(40) path 'itemName',
   ItemQuantity number path 'itemQuantity',
   ItemUnitPrice number path 'itemUnitPrice',
   XMLTABLE PO_INDEX_TAB2 '/Part'
```

-continued

| CREATE INDEX Statement 2 |
|---|
| Columns PartNo number path '@partNo',<br>PartPrice number path 'partPrice'); |

The "CREATE INDEX" statement internally generates two tables PO_INDEX_TAB and PO_INDEX_TAB2 with an internally generated PO_INDEX_TAB.SID column to be joined with an internally generated PO_INDEX_TAB2.PID column. The SID and PID are identifiers automatically generated by the database server to uniquely identify a row in a table. In one embodiment, when the SID and PID are the same, it indicates that the itemNo, itemName, itemQuantity, itemUnitPrice and the DetailsCmt came from the same lineItem.

Once the XML table index has been created with the linked tables, a user may create a query on the index that accesses the chained table to get a specific result set. For example, Q7 can be rewritten into a new query Q8 as follows:

| Q8 |
|---|
| select (select XMLAgg(MKINI(P3.LOBPtr))<br>  from PO_PATH_INDX_TAB p3<br>  where p3.path = "/PurchaserOrder/lineItem" and<br>  exists(select 1<br>    from PO_XMLTAB_IDX_PART_TAB t<br>    where t.DocId = p3.DocId and t.partNo<br>    > 45 and t.partPrice > 34.45 and<br>    parent( t.orderedkey) =<br>    p3.orderedkey)<br>  order by p3.orderedkey)<br>from purchaseOrder v; |

The new query plan Q8 returns a result set generated from PO_INDEX_TAB and a correlated result set generated from PO_INDEX_TAB2. Those two result sets are joined together (for example, by PID and SID). The resulting view shows all the ItemNo, ItemName, ItemUnitPrice, PartNo and PartPrice from lineItems having the defined predicate conditions.

For the purpose of illustration, two groups of nodes whose levels are next to each other in a hierarchical order are used to show how their respective XML Table Index tables may be chained. However, this invention is not limited to groups of nodes with levels next to each other. In some embodiments, the same chain table scheme can be used to chain a first XML Table Index relating to a first group of nodes with a second XML Table Index relating to a second group of nodes even though the first group of nodes may be several levels away from the second group of nodes. These and other variations of accessing and collaborating on one or more files are within the scope of the present invention.

Cost Based Decision

FIG. 1 is a flowchart illustrating how queries on a collection of XML documents stored in one or more data structures in a database system can leverage a XML Table Index table and a XML Path Index table in an embodiment. At step 110, the database system intercepts a user submitted query. An example of such a query is Q1 as shown before. In one embodiment, the collection of XML documents is indexed by a first table and a second table. The first table is the XML Table Index table while the second table is the XML Path Index table. The XML Table Index table comprises a plurality of columns, wherein each column is associated with one or more criteria and contains values of nodes that are in the collection of XML documents and that satisfy one or more criteria. In one embodiment, the one or more criteria comprise a set of path expressions, each of which identifies a commonly searched node contained in the XML documents.

The XML Path Index table comprises a set of entries, each entry in the set of entries being associated with a given node contained in the XML documents. Furthermore, such entry includes location data for locating XML content associated with the given node, as well as path data that corresponds to a path through the structure of the XML document that contains the given node, to the given node. As used herein, the terms "entry" may be used to refer to a row of a database table. Path data can be in the form of a path expression such as "/lineItem/itemUnitPrice", "itemQuantity", etc.

In one embodiment, the query comprises a plurality of predicates. The plurality of predicates may be evaluated using the values of nodes contained in the plurality of columns in the first table.

At step 120, the database system generates a first query plan using both the first table and the second table. This first query plan may correspond to any of the rewritten queries Q4, Q6 and Q8 as illustrated above, or any other query plan that makes a combined use of the XML Table Index table and the XML Path Index table. In some embodiments, this first query plan, when executed by the database system, causes the database system to perform a number of steps such as identifying one or more first entries from the first table, each of the one or more first entries from the first table satisfying the plurality of predicates; identifying second information from the one or more first entries identified from the first table; and extracting the first information from one or more second entries in the second table using the second information.

At step 130, the database system prepares additional alternative query plans that would produce the same results as the first query plan. The additional query plans are not required to use both XML Table Index table and XML Path Index table. Furthermore, some of the additional query plans may not use either XML Table Index table or XML Path Index table. For example, some query plans may retrieve XML documents from the database storage and perform direct XQuery and XPath types of accesses on the retrieved documents.

Finally, at step 140, the database system selects a plan from all available query plans based on cost information associated with each of the all available query plans. In one embodiment, the lowest cost plan is selected for execution.

For the purpose of illustration, examples have been made to associate a column in the XML Table Index table to one node in the collection of XML documents. The present invention is not so limited. In some embodiments, a column may map to two or more nodes in the collection of XML documents. For example, a single column "UserName" in a XML Table Index may map to two nodes "FirstName" and "Last Name".

For the purpose of illustration, examples have been made to first look up the XML Table Index and then use the results to probe the XML Path Index table. The present invention is not so limited. In some embodiments, a query may obtain results from the XML Path Index first and use the results to probe the XML Table Index. Thus, these and other variations of alternative table accesses in a query plan are within the scope of the present invention.

For the purpose of illustration, examples have been made to evaluate predicate expressions for selection access using XML Table Index. The present invention is not so limited. In some embodiment, the XML Path Index may be used to evaluate predicate expressions for selection access. Thus, these and other variations of alternative selection access in a query plan are within the scope of the present invention.

Hardware Overview

Figure 2:
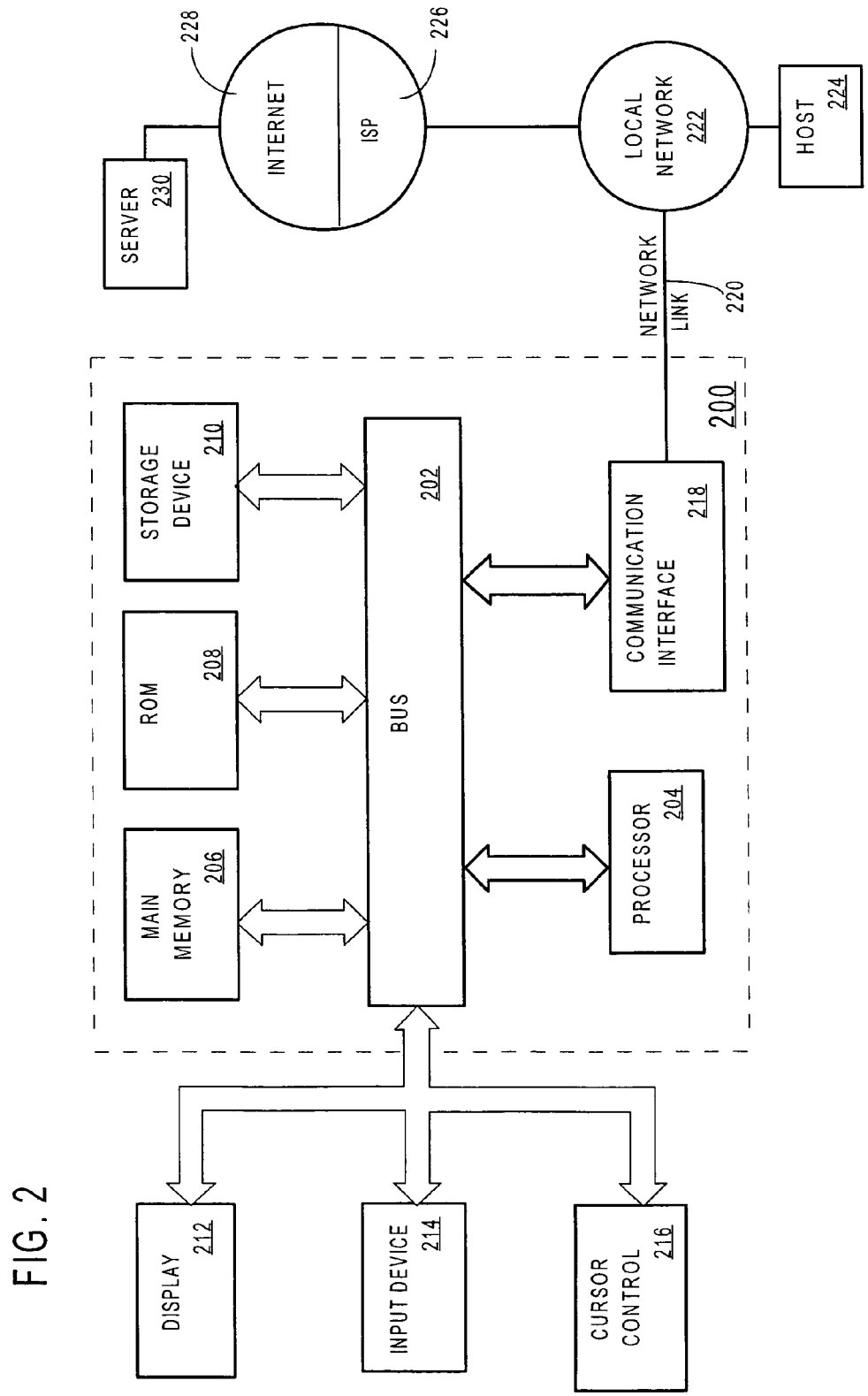
FIG. 2 is a block diagram of a system upon which the techniques described herein may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method comprising:

causing execution of an index generation statement identifying a plurality of path expressions and a plurality of columns of a first table for indexing a collection of documents, wherein said plurality of path expressions identify less than all nodes in the collection of documents;

wherein for each column of said plurality of columns, said index generation statement specifies an association between said each column and a respective path expression of said plurality of path expressions;

wherein execution of said index generation statement causes generation of said first table, wherein the first table comprises a first set of entries;

wherein for each column of the plurality of columns of said first table, each entry of the first set of entries contains a node value of a node identified by the respective path expression of said each column, said node value being from a document of said collection of documents;

wherein the collection of documents is also indexed by a second table, wherein the second table comprises a second set of entries, each entry in the second set of entries:

being associated with a given node of a document in the collection of documents, and including location data for locating content in the document, wherein the content is associated with the given node and path data that corresponds to a path to the given node in the document;

intercepting, by a database system, a query for first information from a collection of documents, wherein the query for first information does not reference said first table and said second table;

said database system rewriting the query for first information to generate a rewritten query that references said first table and said second table;

wherein the query comprises one or more predicates;

based on the rewritten query, said database system generating a first query plan using both the first table and the second table, wherein the first query plan, when executed by the database system, causes the database system to perform:

identifying one or more first entries from the first table that contain a node value that satisfies the one or more predicates;

extracting second information from the one or more first entries identified from the first table;

extracting, using the second information, the first information from one or more second entries in the second table;

wherein the first table and the second table are two different tables.

2. The method of claim 1, further comprising building a secondary index for one or more columns in the plurality of columns in the first table.

3. The method of claim 1, further comprising performing a joining of the first table and the second table based on one or more columns indexed by a secondary index.

4. The method of claim 3, wherein one of the one or more columns indexed by the secondary index is a document identifier column.

5. The method of claim 3, wherein the one or more columns indexed by the secondary index comprise hierarchical order information.

6. The method of claim 1, further generating one or more different query plans without accessing both said first table and the second table; and determining cost information for each of the first query plan and the one or more different query plans; and selecting a second query plan among the first query plan and the one or more different query plans using the cost information based on a set of selection criteria.

7. The method of claim 1, wherein the first table includes one or more references to a set of additional tables, and wherein the one or more references to the set of additional tables create a table chain.

8. The method of claim 1, wherein at least one document in the collection of documents is stored in aggregate storage.

9. The method of claim 1, wherein at least one document in the collection of documents is stored object-relationally.

10. The method of claim 1, wherein at least one document in the collection of documents is stored in a tree form.

11. The method of claim 1, wherein one of the plurality of columns is a virtual column.

12. The method of claim 1, wherein a column from the plurality of columns maps to two or more nodes.

13. The method of claim 1, wherein the first table includes at least one column of the plurality of columns that stores node hierarchical order information projected by a row pattern.

14. The method of claim 1, further comprising generating the first table using a data definition language statement.

15. A volatile or non-volatile computer-readable medium storing one or more sequences of instructions which, when executed by one or more processors, cause:

executing an index generation statement identifying a plurality of path expressions and a plurality of columns of a first table for indexing a collection of documents wherein said plurality of path expressions identify less than all nodes in the collection of documents wherein for each column of said plurality of columns, said index generation statement specifies an association between said each column and a respective path expression of said plurality of path expressions;

wherein execution of said index generation statement causes generation of said first table, wherein the first table comprises a first set of entries;

wherein for each column of the plurality of columns of said first table, each entry of the first set of entries contains a node value of a node identified by the respective path expression of said each column, said node value being from a document of said collection of documents;

wherein the collection of documents is also indexed by a second table, wherein the second table comprises a second set of entries, each entry in the second set of entries:
- being associated with a given node of a document in the collection of documents, and
- including location data for locating content in the document, wherein the content is associated with the given node and path data that corresponds to a path to the given node in the document; and intercepting, by a database system, a query for first information from a collection of documents, wherein the query for first information does not reference said first table and said second table;

said database system rewriting the query for first information to generate a rewritten query that references said first table and said second table;

wherein the query comprises one or more predicates;

based on the rewritten query, said database system generating a first query plan using both the first table and the second table, wherein the first query plan, when executed by the database system, causes the database system to perform:
- identifying one or more first entries from the first table that contain a node value that satisfies the one or more predicates;
- extracting second information from the one or more first entries identified from the first table;
- extracting, using the second information, the first information from one or more second entries in the second table wherein the first table and the second table are two different tables.

16. The medium of claim 15, wherein the one or more sequences of instructions further comprise instructions which, when executed by one or more processors, causes the one or more processors to perform building a secondary index for one or more columns in the plurality of columns in the first table.

17. The medium of claim 15, wherein the one or more sequences of instructions further comprise instructions which, when executed by one or more processors, causes the one or more processors to perform a joining of the first table and the second table based on one or more columns indexed by a secondary index.

18. The medium of claim 17, wherein one of the one or more columns indexed by the secondary index is a document identifier column.

19. The medium of claim 17, wherein the one or more columns indexed by the secondary index comprise hierarchical order information.

20. The medium of claim 15, wherein the one or more sequences of instructions further comprise instructions which, when executed by one or more processors, causes the one or more processors to perform:
- generating one or more different query plans without accessing both said first table and the second table; and
- determining cost information for each of the first query plan and the one or more different query plans; and
- selecting a second query plan among the first query plan and the one or more different query plans using the cost information based on a set of selection criteria.

21. The medium of claim 15, wherein the first table includes one or more references to a set of additional tables, and wherein the one or more references to the set of additional tables create a table chain.

22. The medium of claim 15, wherein at least one document in the collection of documents is stored in aggregate storage.

23. The medium of claim 15, wherein at least one document in the collection of documents is stored object-relationally.

24. The medium of claim 15, wherein at least one document in the collection of documents is stored in a tree form.

25. The medium of claim 15, wherein one of the plurality of columns is a virtual column.

26. The medium of claim 15, wherein a column from the plurality of columns maps to two or more nodes.

27. The medium of claim 15, wherein the first table includes at least one column of the plurality of columns that stores node hierarchical order information projected by a row pattern.

28. The medium of claim 15, wherein the one or more sequences of instructions further comprise instructions which, when executed by one or more processors, causes the one or more processors to perform generating the first table using a data definition language statement.

* * * * *

UNITED STATES PATENT AND TRADEMARK OFFICE
CERTIFICATE OF CORRECTION

PATENT NO. : 9,436,779 B2  
APPLICATION NO. : 11/601146  
DATED : September 6, 2016  
INVENTOR(S) : Liu et al.

It is certified that error appears in the above-identified patent and that said Letters Patent is hereby corrected as shown below:

On the Title Page

On page 2, Column 2, under Other Publications, Line 22, delete "stoage" and insert -- storage --, therefor.

In the Specification

In Column 2, Line 11, delete "Assming" and insert -- Assuming --, therefor.

In Column 10, Line 11, delete ""/PurchaserOrder/linteItem"" and insert -- "/PurchaserOrder/lineItem" --, therefor.

In Column 11, Line 38, delete "p3.orderedke)" and insert -- p3.orderedkey) --, therefor.

In Column 12, Line 45, delete "Index index" and insert -- Index --, therefor.

In Column 12, Line 52, delete "Index index" and insert -- Index --, therefor.

Signed and Sealed this  
Sixteenth Day of May, 2017

Michelle K. Lee  
*Director of the United States Patent and Trademark Office*